United States Patent [19]
Thoen

[11] Patent Number: 5,394,071
[45] Date of Patent: Feb. 28, 1995

[54] CONTROL NETWORK WITH ON-LINE ITERATION AND ADAPTIVE FILTER

[75] Inventor: Bradford K. Thoen, Eden Prairie, Minn.

[73] Assignee: MTS Systems Corportion, Minneapolis, Minn.

[21] Appl. No.: 187,410

[22] Filed: Jan. 27, 1994

Related U.S. Application Data

[63] Continuation-in-part of Ser. No. 20,060, Feb. 19, 1993, abandoned.

[51] Int. Cl.$^6$ .............................................. G11B 33/00
[52] U.S. Cl. ................................... 318/610; 318/561; 318/632; 375/13
[58] Field of Search .............................. 318/560–636; 360/36.2, 36.1; 364/160–197

[56] References Cited

U.S. PATENT DOCUMENTS

| | | | |
|---|---|---|---|
| 3,961,234 | 6/1976 | Chambers et al. | 318/561 |
| 4,195,337 | 3/1980 | Bertrand | 364/106 |
| 4,232,364 | 11/1980 | Bibbero | 364/105 |
| 4,829,299 | 5/1989 | Mandell | 341/77 |
| 4,882,526 | 11/1989 | Iino et al. | 318/561 |
| 4,905,101 | 2/1990 | Ohta et al. | 360/36.2 |
| 4,912,381 | 3/1990 | Culberson | 318/561 |
| 4,912,387 | 3/1990 | Moulds | 318/629 |
| 4,947,666 | 8/1990 | Hametner et al. | 72/37 |
| 4,980,625 | 12/1990 | Shinada | 318/508.1 |
| 4,998,051 | 3/1991 | Ito | 318/632 |
| 5,046,852 | 9/1991 | Hametner et al. | 356/398 |
| 5,084,902 | 1/1992 | Aotani et al. | 375/13 |
| 5,124,626 | 6/1992 | Thoen | 318/610 |
| 5,155,422 | 10/1992 | Sidman et al. | 318/560 |
| 5,157,596 | 10/1992 | Alcone | 364/148 |
| 5,164,962 | 11/1992 | Nakai et al. | 375/13 |

OTHER PUBLICATIONS

Excerpts from book entitled *Adaptive Processing*, By B. Widrow et al., Prentice-Hall, Inc., Englewood Cliffs, N.J. 07632.

Article entitled *Focus on ATE and CAD Aspects of Computer-Aided Testing* from Feb./Mar. 1991 "Automotive Engineer" magazine.

Article entitled *Digital Hydraulic Controllers–A Path to High-Accuracy Component Testing* By S. S. Styles, from Jun. 1990 "Environmental Engineering" magazine.

Article entitled *Multirate Digital Filters, Filter Banks, Polyphase Networks, and Applications: A Tutorial* by P. Vaidyanathan, from Jan. 1990 "Proceeding of the IEEE," vol. 78 No. 1.

Article entitled *Adaptive Frequency Sampling Filters* By R. Bitmead et al., from "IEEE Transactions on Acoustics, Speech, and Signal Processing," vol. ASSP-29, No. 3, Jun. 1981.

*Software Manual* of MTS Sytems Corporation entitled RPC TM III, vol. 1, Jan. 1993.

Article entitled *Iterative Transfer Function Compensation Using A Time-Domain And A Frequency-Domain Approach* by J. Craig B.Sc. and Carl Schenck Ag. Darmstadt from Oct. 1993.

Primary Examiner—Paul Ip
Attorney, Agent, or Firm—Kinney & Lange

[57] ABSTRACT

A feedback control system modifies a drive signal to a plant which provides an achieved response signal in response to the drive signal. A first summing element provides a response error signal representing the difference between a desired response signal and the achieved response signal. An adaptive filter adjusts the response error signal in accordance with a dynamic behavior of the adaptive filter to provide a drive correction signal, the dynamic behavior being adjusted by a compensation device in response to the drive signal and the achieved response signal. A second summing element provides a corrected drive signal representing the sum of the drive signal and the drive correction signal. A storage device delays the corrected drive signal and a converter generates the drive signal during the next iteration as a function of the delayed corrected drive signal.

22 Claims, 6 Drawing Sheets

CONTROL NETWORK WITH ON-LINE ITERATION AND ADAPTIVE FILTER

This is a continuation-in-part of application Ser. No. 08/020,060, filed Feb. 19, 1993, abandoned.

BACKGROUND OF THE INVENTION

The present invention relates to a closed-loop control system, and more particularly, to feedback control systems utilizing adaptive inverse control to adjust output signals in a test system.

A feedback control system operates to achieve prescribed relationships between selected system variables by comparing functions of those variables and using the comparison to affect control. System variables are those quantities or conditions of the system which are subject to change. Examples of such variables include an electrical voltage level generated by an amplifier or physical force applied to a specimen by a servoactuator. Control is the governing of the response of the controlled subsystem such as rotational velocity of an electrical motor, strain in a structural member of a truss, or position of an elevator. A sinusoidal signal amplitude and phase control for an adaptive feedback control system is disclosed in the Thoen U.S. Pat. No. 5,124,626, assigned to the same assignee as the present invention, and herein incorporated by reference.

Changes in operating conditions or in transfer functions of system elements can affect a feedback control system. External disturbances can also affect any system variable. While such external disturbances do not themselves change the transfer function of the system, they can affect system accuracy in following the desired function values. In addition, under the influence of an experiment, physical changes can occur in the controlled subsystem which change the subsystem's transfer characteristics over time. Such changes affect the output response generated by a particular actuation signal and necessitate repeated tuning of the control system in some experiments.

Adaptive inverse control (AIC) is a technique for achieving good tracking response in a closed loop control system. AIC places an adaptive filter between a function generator and a feedback loop comprising a subsystem to be controlled. The feedback loop is commonly referred to as a plant. The purpose of the adaptive filter is to compensate for the plant's frequency response irregularities. If the adaptive filter has a dynamic behavior which substantially matches the inverse frequency response function of the plant, an overall input-output frequency response of unity is achieved over a broad range of frequencies. A key to adaptive inverse control is that a network adjusts the inverse frequency response function applied to the filter while the plant is actually operating, or online. In this way, the controller adapts to changing conditions.

SUMMARY OF THE INVENTION

The present invention relates to a feedback control system for modifying a drive signal to a plant. The plant provides an achieved response signal in response to the drive signal. The control system includes a first summing element for providing a response error signal representing the difference between a desired response signal and the achieved response signal. An adaptive filter adjusts the response error signal in accordance with a dynamic behavior of the adaptive filter to provide a drive correction signal. A compensation device adjusts the dynamic behavior of the adaptive filter in response to the drive signal and the achieved response signal. A second summing element provides a corrected drive signal representing the sum of the drive signal and the drive correction signal. A storage device delays the corrected drive signal. A converter provides the modified drive signal as a function of the signal delayed by the storage device.

Typically, the plant has a dynamic behavior and the compensation device adjusts the dynamic behavior of the adaptive filter to substantially match the inverse of the dynamic behavior of the plant. The compensation device preferably includes a least-mean-square network for approximating the dynamic behavior of the plant.

In a preferred embodiment of the invention, the control system includes a switch operable to a first mode during a first iteration of a test and to a second mode during subsequent iterations of the test. During the first iteration of the test, the control system creates an initial drive signal to the plant and compensation device. During the second and subsequent iterations of the test, the control system operates to modify the drive signal to the plant and compensation device. The adaptive filter operates in response to the first mode to adjust the desired response signal in accordance with a dynamic behavior of the adaptive filter to provide the initial drive signal. During the second mode the adaptive filter adjusts the response error signal representing the difference between the desired response signal and the achieved response signal. The storage device operates in response to the first mode to delay the initial drive signal and in response to the second mode to delay the corrected drive signal. The storage device serves to delay the corrected drive signal to operate the converter to provide the drive signal for the next iteration of the test.

The control system preferably includes a gain circuit operable in response to the second mode of the switch for controlling the magnitude of the drive correction signal. The gain circuit preferably controls the magnitude of the drive correction signal as a function of a ratio of an instantaneous value of the response error signal to an average value of the response error signal.

DETAILED DESCRIPTION OF THE PREFERRED EMBODIMENTS

Like reference characters will be used for like elements throughout the drawings. As background to the on-line iteration control system of the present invention, an explanation of adaptive inverse control (AIC) is in order.

Figure 1:
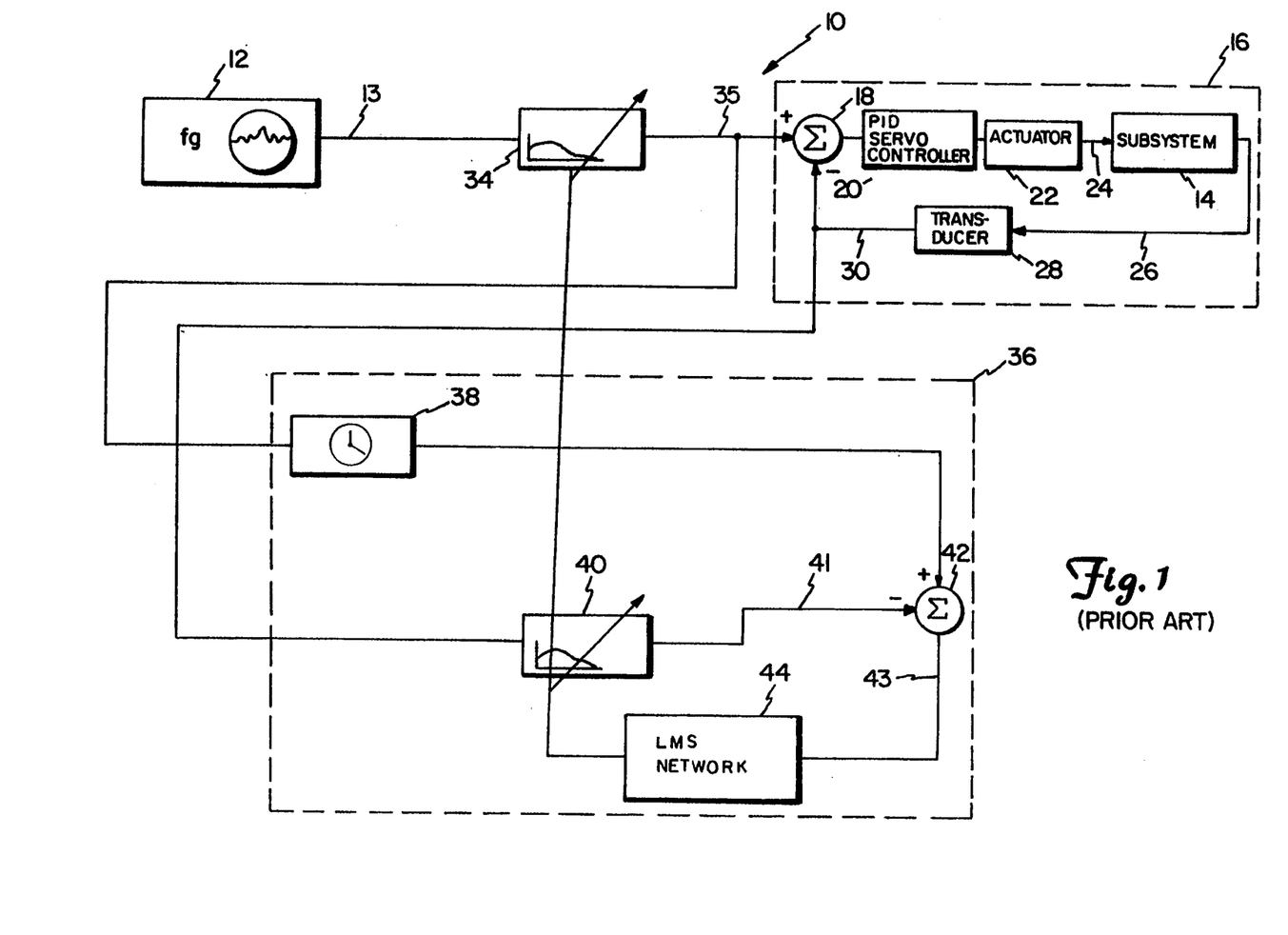
FIG. 1 is a block diagram of a control system utilizing adaptive inverse control.

A control system utilizing AIC is generally indicated at 10 in FIG. 1. A function generator 12 generates a desired response signal at output 13, that is sent to control system 10. Feedback control system 10 controls the output response of a controlled subsystem 14.

A negative feedback loop 16 directly controls subsystem 14 which is contained within feedback loop 16. Feedback loop 16 includes a summing element 18 which subtracts a feedback signal, at 30, from a drive signal, at 35, to generate an error signal. A servocontroller 20, such as a proportional-integral-derivative (PID) servocontroller, responds to the error signal to provide an actuation signal. An actuator 22 responds to the actuation signal to directly mechanically manipulate a drive variable, indicated by arrow 24, to controlled subsystem 14. The achieved response of controlled subsystem 14 is a directly controlled mechanical variable, indicated by arrow 26, and is applied to a transducer 28 which measures the achieved response 26 and generates the feedback signal at 30. The parameters of servocontroller 20 can be adjusted manually or with an auto-tuning algorithm.

As an example of feedback loop 16 (also referred to as plant 16) controlled subsystem 14 is an automobile suspension under test, actuator 22 is a servohydraulic mechanism designed to mechanically vibrate the suspension in response to an actuation signal, PID servocontroller 20 provides the actuation signal to simulate road conditions for the suspension under test, and transducer 28 measures the achieved mechanical response of the suspension and generates the electrical feedback signal at 30.

Control system 10 utilizes AIC as a technique for achieving good tracking response in the control system. An adaptive filter 34 is interposed between function generator 12 and plant 16. Adaptive filter 34 compensates for frequency response irregularities in plant 16. Adaptive filter 34 is preferably implemented with a finite impulse response (FIR) digital filter responsive to an inverse plant identifier (IPI) network 36. If adaptive filter 34 provides the inverse frequency response function of the plant 16, an overall input/output frequency response of unity can be achieved over a broad range of frequencies.

IPI network 36 approximates the inverse frequency response function of plant 16 on-line, or while system 10 is operating, and adjusts the frequency response function of adaptive filter 34 to substantially match the inverse frequency response function of plant 16. By approximating the dynamic behavior of plant 16 on-line, control system 10 adapts to changing conditions.

IPI network 36 matches the desired response signal from function generator 12 to the feedback signal at 30. Automatic matching of the feedback signal at 30 and the desired response signal at 13 requires comparison of the desired response signal and the feedback signal or some representation of these signals. In control system 10, the output of adaptive filter 34, indicated at 35, is the drive signal, and the drive signal at 35 and the feedback signal at 30 are provided to IPI network 36. The drive signal is delayed by causality delay circuit 38, the purpose of which is to delay the drive signal to match the delay caused by plant 16, such as the delay in the feedback signal 30 resulting from mechanical translations at 24 and 26. By delaying the output of adaptive filter 34, the adaptive filter does not need to be a prediction filter. An adaptive filter 40 which is substantially identical to the first adaptive filter 34, provides an adjusted feedback signal, at 41. The output of causality delay circuit 38 and the adjusted feedback signal at 41 are compared by a summing element 42, which subtracts the adjusted feedback signal from the causality delay 38 output to generate a difference or error signal, at 43. It will be appreciated that the adjusted feedback signal at 41 represents an estimate of the drive signal at 35 that gave rise to the feedback signal at 30. More particularly, summing element 42 compares the actual drive signal to the estimated drive signal. If adaptive filters 34 and 40 accurately represent the inverse frequency response of plant 16, the actual and estimated drive signals will be equal; if adaptive filters 34 and 40 do not represent the response of plant 16, an error signal results at 43. The error signal at 43 is provided to a least-mean-square (LMS) algorithm network 44. The LMS algorithm utilizes a steepest descent type of adaptive algorithm in approximating the dynamic behavior of plant 16. LMS network 44 provides an output to adjust both adaptive filters 34 and 40 in the same manner. Hence, both the desired response signal and the feedback signal are filtered through substantially identical adaptive filters prior to being compared.

Figure 2:
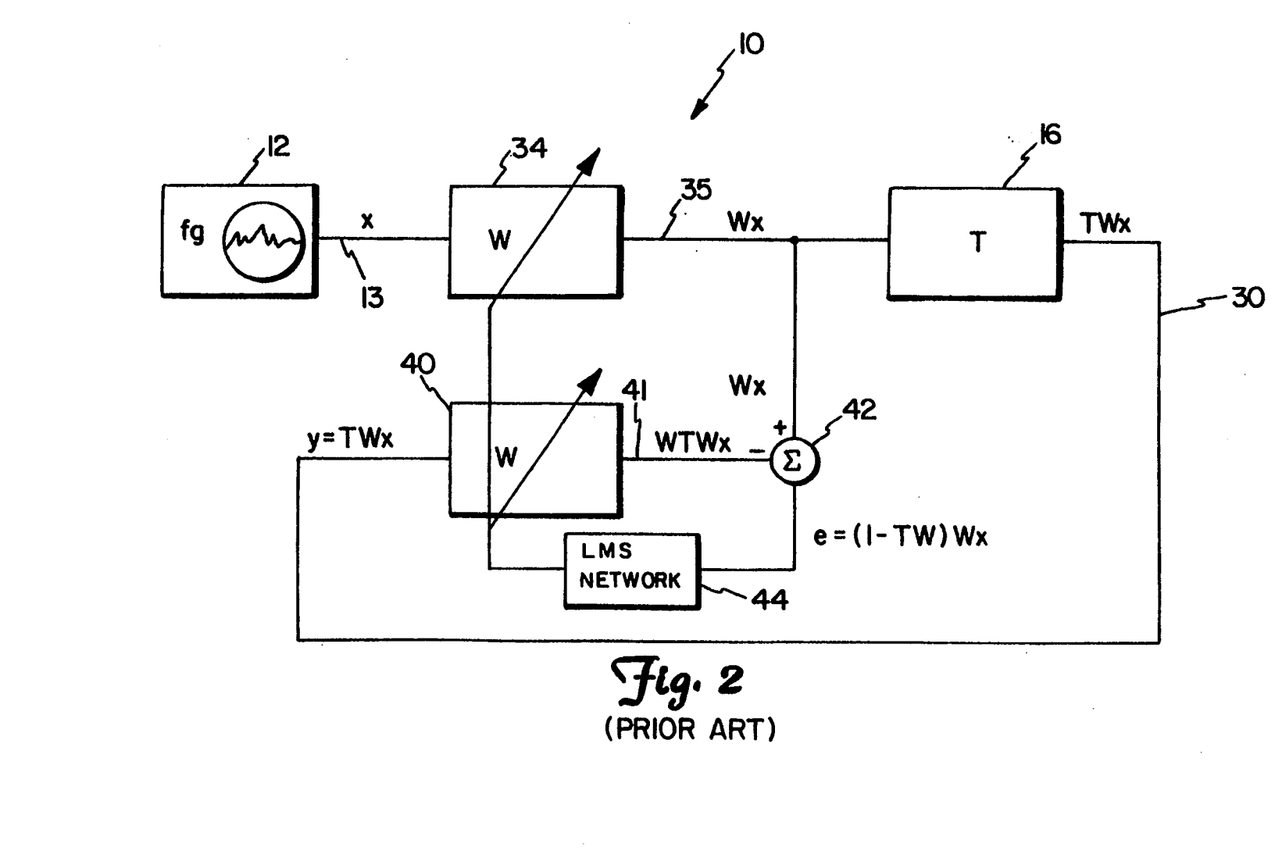
FIG. 2 is an operational block diagram illustrating the operation of adaptive inverse control for the control system of FIG. 1.

The operation of AIC is illustrated in FIG. 2. The desired response signal at 13 from function generator 12 is represented by x. The dynamic behavior or transfer function of plant 16 is represented by T. The transfer function of the adaptive filters 34 and 40 is represented by W. Thus, the drive signal at 35 produced by adaptive filter 34 is represented by Wx, and the feedback signal at 30 generated by plant 16 is represented by TWx. The adjusted feedback signal at 41 from adaptive filter 40 is represented by WTWx. Therefore, the inputs into summing element 42 are Wx and WTWx, which produces the error signal at 43 represented by an error of $e = (1 - TW)Wx$. When the error (e) is equal to zero, $1 - TW = 0$. Correspondingly, when $e = 0$, $W = T^{-1}$, which is another way of expressing that adaptive filter 34 and adaptive filter 40 have a transfer function equal to the inverse frequency response function of plant 16 when the error is equal to zero. Thus, LMS algorithm network 44 approximates the inverse transfer function of plant 16 by receiving the error signal represented by e, and correspondingly adjusts the transfer function of filters 34 and 40 by adjusting the filter's weight vector represented by W to drive the value of e to zero.

Assuming that $W_k$ is equal to the LMS algorithm weight vector and $Y_k$ is equal to the input vector at time k, then the LMS algorithm is expressed by the following equation:

$$W_{k+1} = W_k + 2\mu Y_k e_k$$

Where
e = the error signal; and
$\mu$ = the gain constant that regulates the speed and stability of adaption.

The LMS algorithm is implemented in a practical system without squaring, averaging, or differentiation and, therefore, offers simplicity and efficiency. Because the LMS algorithm does not perform averaging, the gradient components contain a large component of noise, but the noise is attenuated with time by the adaptive process, which essentially acts as a low-pass filter in this respect.

The desired response signal at 13 from function generator 12 comprises a plurality of signal components, each having a distinct amplitude and a distinct frequency in a range of relatively high and low frequencies. In typical automobile suspension testing, the desired signal comprises signal components with frequencies ranging from approximately 0 to 50 Hz.

In some cases, particularly in automobile suspension testing apparatus, it is desirable to control acceleration at the automobile tire spindle. A control system utilizing AIC for controlling acceleration is generally indicated at 50 in FIG. 3. As in control system 10, the hydraulic actuators 22 of control system 50 mechanically operate the automobile suspension in response to position control signals, rather than acceleration signals. Thus, control system 50 provides the drive signal at 35, representing position, to plant 51. Unlike control system 10, in control system 50, a remote sensor 53 senses acceleration such as the acceleration at an automobile tire spindle and provides an achieved response signal, at 52, representing the sensed acceleration. Consequently, control system 50 operates in a "mixed mode" control because the loop comprising IPI network 36 operates on acceleration signals and the loop comprising PID controller 20 operates on position signals. In this case, adaptive filter 34 operates as a double integrator which converts the desired response signal representing acceleration to the equivalent stroke command or position signal to control the hydraulic actuator. Thus, adaptive inverse filter 34 converts the desired response signal from acceleration to stroke as well as compensates for the frequency response function of plant 16.

Figure 3:
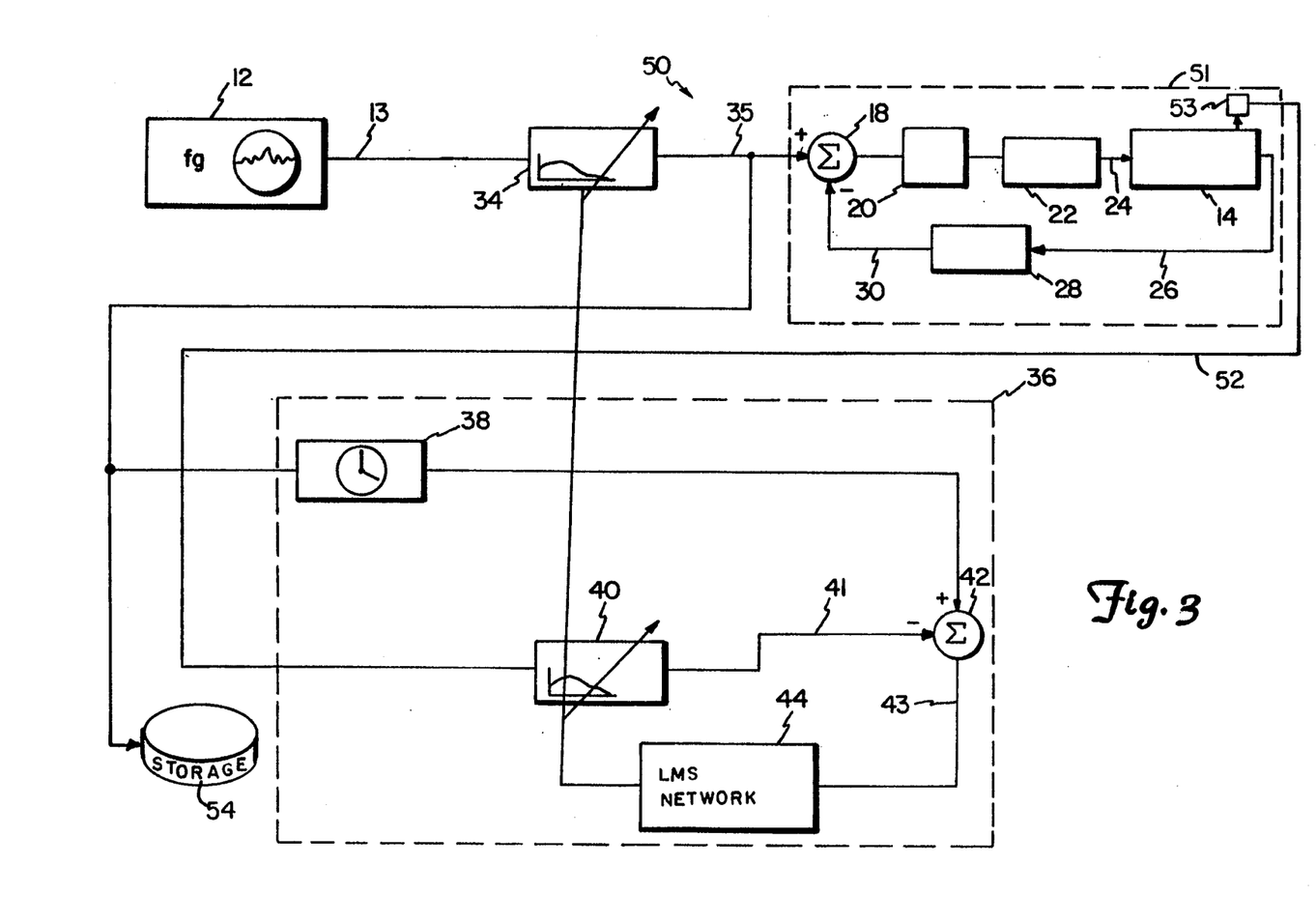
FIG. 3 is a block diagram of a mixed mode control system utilizing adaptive inverse control.

Since adaptive filter 34 is a linear filter, the filter only compensates for a plant that is predominantly linear. When a plant is not predominantly linear, then some but not all of the tracking error is removed. In mixed mode control applications, such as illustrated in FIG. 3, where a remote sensor is employed, the sensing results in significant plant non-linearities. In order to compensate for the non-linearities of a plant in mixed mode control applications, an iteration control technique is utilized. In prior control systems, this iteration technique did not utilize AIC and was done off-line.

The traditional Off-line technique for performing iteration control involves several steps. First, the frequency response function (FRF) of a plant is estimated based on the plant's measured response to a broadband signal such as "whim noise." Second, the inverse FRF is calculated. These first two steps involve off-line signal processing which requires complex fast fourier transform function calculations. In the third step, an initial drive signal estimate is back calculated by convolving the desired response signal with the calculated inverse FRF. Fourth, the initial drive signal estimate is played out through a full cycle. Fifth, a response error is measured representing the difference between the achieved response of the plant and the desired response. Sixth, a drive correction signal is calculated by convolving the response error with the inverse FRF. Seventh, a new drive signal to be used in the next iteration is calculated by adding the drive correction signal to the old drive signal. Steps 4–7 are repeated such that the new drive is played out through a full cycle, a response error measured, a drive correction signal calculated, and a new drive signal calculated. In this way, steps 4–7 are repeated until the response error is reduced to a sufficiently small level.

Figure 4:
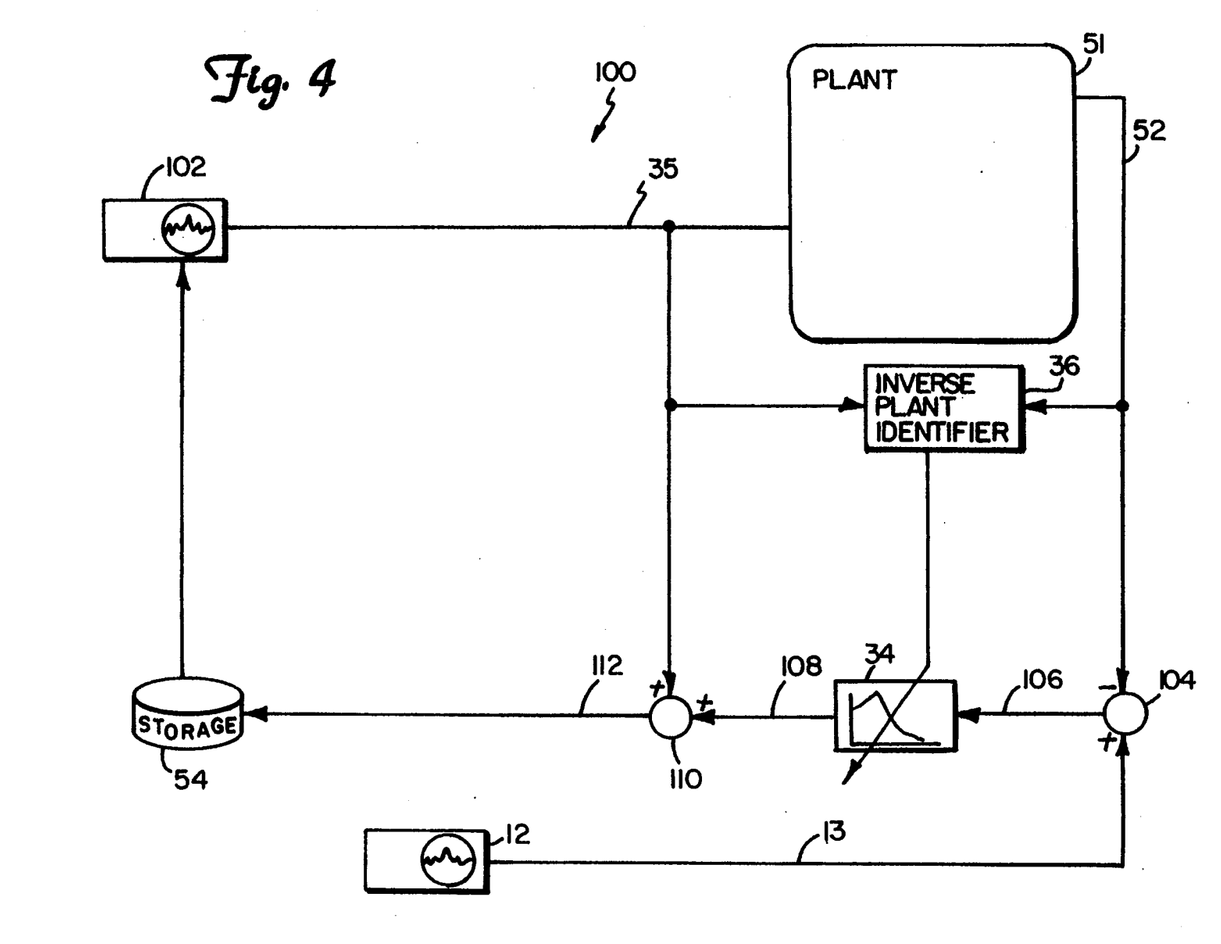
FIG. 4 is a block diagram of an on-line iteration control system according to the present invention utilizing adaptive inverse control.

An on-line iteration control system according to the present invention utilizing adaptive inverse control is generally indicated at 100 in FIG. 4. At the start of a test, the first drive signal is undefined. For non-mixed mode control systems, the desired response signal can be substituted for the first drive signal at 35 since both signals have the same physical dimension. However, for mixed mode control systems, such as control system 50 and control system 100, a first drive signal must be created by running the AIC control system through at least one iteration of the test. In this way, on-line AIC replaces the first three steps of the above described traditional off-line technique for performing iteration. Referring to FIG. 3, IPI network 36 utilizes the LMS algorithm to estimate the inverse FRF of the plant so as to adjust the inverse FRF of adaptive filter 34 to replace the first two steps of the traditional technique. The third step of estimating the initial drive signal is replaced by adaptive filter 34 which adjusts the desired response signal at the output 13 of function generator 12 to provide the first drive signal at 35, which is recorded on a storage disc 54.

Referring to FIG. 4, in subsequent iterations, a converter 102 reads the corrected drive signal recorded on storage disc 54 and generates the drive signal at 35. Storage disc 54 is preferably operated by converter 102 to automatically supply the stored drive signal (or corrected drive signal) to converter 102 for the next iteration, without operator assistance. The new drive signal at 35 is played directly into plant 51. In system 100, summing element 104 subtracts the achieved response signal at 52 from the desired response signal at 13 to provide a response error signal at 106. The response error signal at 106 is adjusted by adaptive filter 34 to provide a drive correction signal at 108. As described above, IPI network 36 adjusts the dynamic behavior of adaptive filter 34 to match the inverse FRF of plant 51 in response to the achieved response signal at 52 and the drive signal at 35. A summing element 110 adds the drive correction signal at 108 to the drive signal at 35 to provide a corrected drive signal at 112. The corrected drive signal at 112 is then recorded on storage disc 54. This iteration sequence is repeated as converter 102 reads the new corrected drive signal from storage disc 54 and generates the new drive signal at 35 for the next iteration. The storage of the corrected drive signal on storage disc 54 provides a delay equivalent to one iteration so that the corrected drive signal can be used during the next iteration. Thus, steps 4–7 of the traditional off-line iteration technique are replaced by the on-line AIC iteration control performed by system 100.

In order to reduce the number of adaptive filters needed to operate the on-line AIC iteration control system, switches may be utilized to permit generation of the first drive signal during the first iteration with the same network that corrects the drive signal in subsequent iterations. An on-line iteration control system utilizing such Switches is generally illustrated at 150 in FIG. 5. The switches used in control system 150 can be implemented with well known techniques such as with software switches or with high speed semiconductor switches. For the sake of clarity, the switches are schematically illustrated, and the control circuits of the switches are not shown. Control system 150 needs only two adaptive filters to perform on-line iteration. During the first iteration of a test, switch 152 is open, which disconnects the achieved response signal at 52 from summing element 104. Thus, the output of summing element 104 is equivalent to the desired response signal at 13 during the first iteration. Also during the first iteration, switch 154 is open, which disconnects the drive signal at 35 from summing element 110. Thus, during the first iteration, the corrected drive signal at 112 is equivalent to the drive correction signal at 108 which is equivalent to the adjusted desired response signal. Also during the first iteration, switch 156 disconnects converter 102 from plant 51 and connects the output of summing element 110 to plant 51. Thus, during the first iteration, adaptive filter 34 produces the drive signal at 35 which is provided to plant 51. During subsequent iterations, switch 152 is closed to connect the achieved response signal at 52 to summing element 104; switch 154 is closed to connect the drive signal at 35 to summing element 110; and switch 156 connects converter 102 to the input of plant 51 and disconnects the output of summing element 110 from plant 51. Therefore, during the second and subsequent iterations, converter 102 produces the drive signal at 35 that is provided to plant 51, and adaptive filter 34 operates as a drive correction filter.

Figure 5:
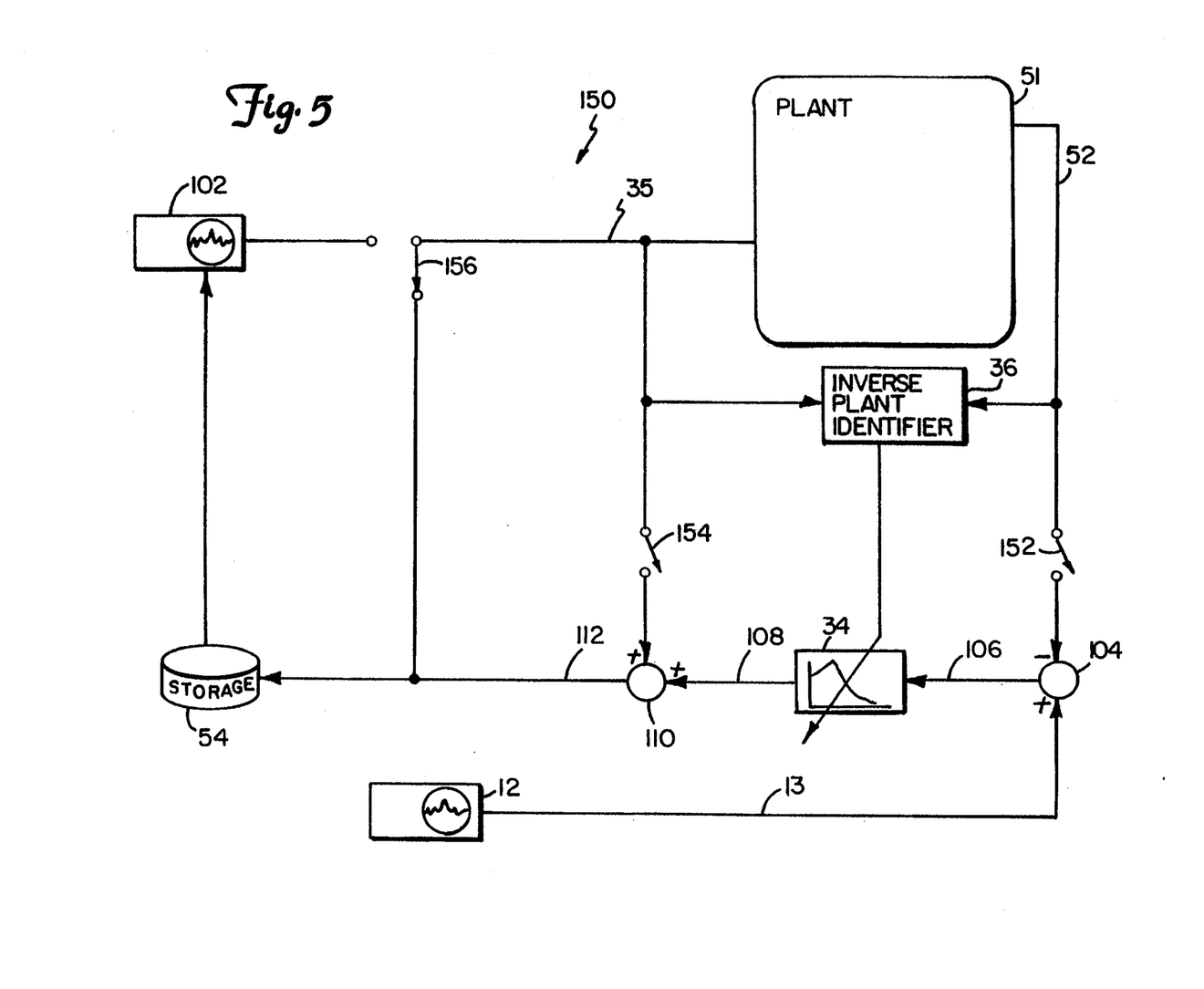
FIG. 5 is a block diagram of an on-line iteration control system according to the present invention utilizing switches to switch an adaptive inverse control network between two modes of operation.

During iterations after the first iteration, the drive correction signal at 108 represents a best linear estimate of the amount of drive error that gave rise to the response error. The LMS algorithm used in IPI network 36 to achieve this best linear estimate is explained above. However, plant 51 is non-linear, and in order for the drive correction signal at 108 to reduce the response error for the next iteration, the approximation performed by IPI network 36 must be sufficiently accurate. The LMS algorithm performs an adequate approximation provided that plant non-linearities are not too severe and the plant non-linearities are repeatable from iteration to iteration.

Figure 6:
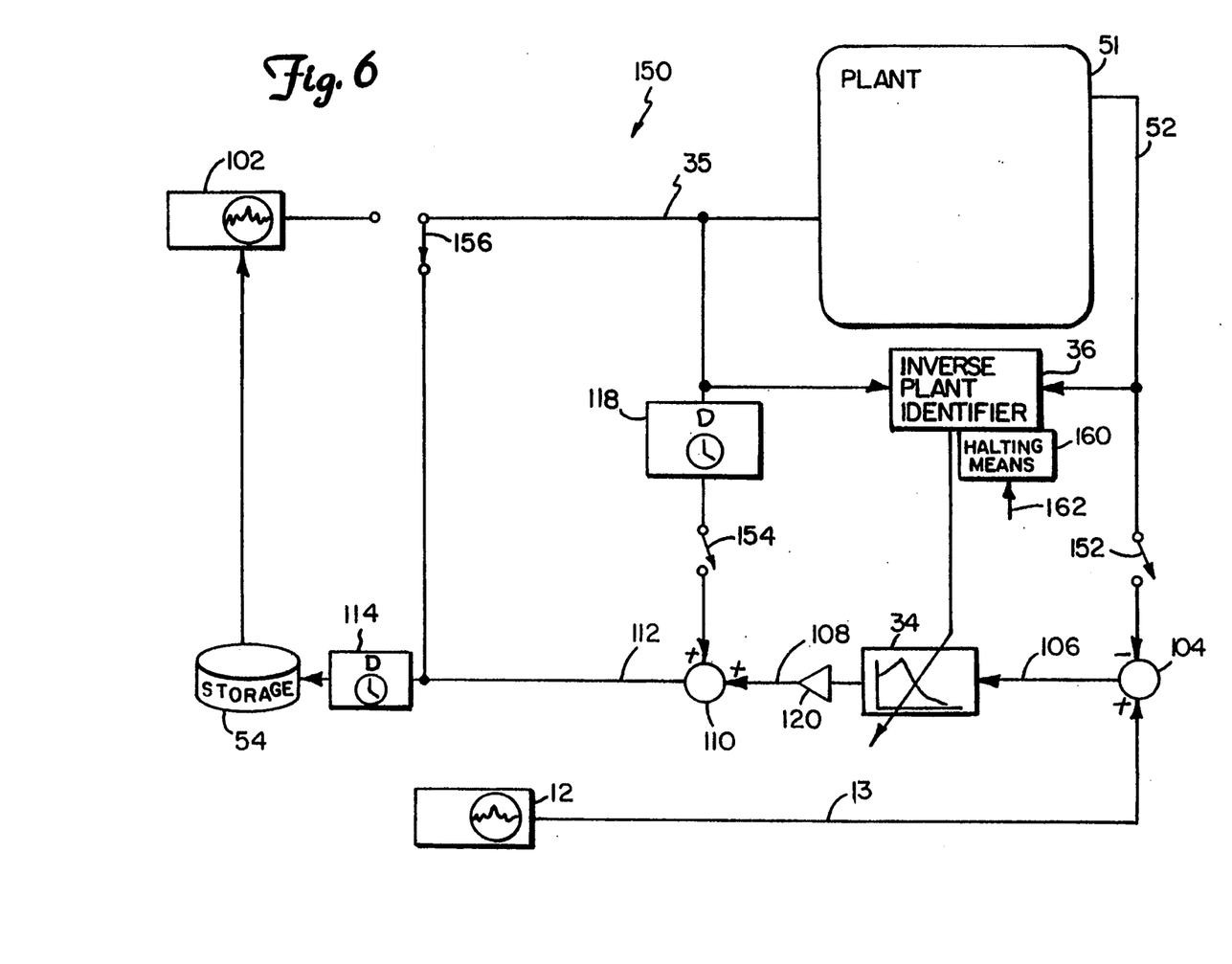
FIG. 6 is a more detailed block diagram of the on-line iteration control system of FIG. 5.

A more detailed block diagram of control system 150 is illustrated in FIG. 6. As explained above, the achieved response signal is delayed by the causality delay of the plant. Accordingly, during the first iteration of a test, a causality delay circuit 114 delays the drive signal at 35 before the drive signal is recorded on storage disc 54. In this way, the storage of data on storage disc 54 is delayed to match the response delay caused by the plant. In subsequent iterations, the delay of causality delay circuit 114 is set to substantially zero. Also during subsequent iterations, a causality delay circuit 118 delays the drive signal at 35 before the drive signal is provided to summing element 110 to match the causality delay of the drive correction signal at 108.

Traditionally, iteration gain is constant throughout the duration of an iteration cycle. The iteration gain of control system 150 is controlled with an iteration gain circuit 120 which is interposed between adaptive filter 34 and summing element 110. Typically, the iteration gain is set to a relatively low value so that the portions of the drive signal that have converged will not be disturbed. However, a low gain value results in slower convergence in the portions of the drive signal with large response errors. Thus, it is desirable to vary the gain setting of circuit 120 so that the iteration gain is reduced to relatively low levels in response to relatively small response errors and increased to relatively high levels in response to relatively large response errors. The variation of the iteration gain is accomplished by varying the gain setting of circuit 120 as a function of the ratio of instantaneous response error to the average response error as expressed by the following equation:

$$v = \min\left[\alpha, \alpha \frac{(e^2)_{inst}}{(e^2)_{avg}}\right]$$

where $v$ is the iteration gain, $\alpha$ is the nominal iteration gain, $(e^2)_{inst}$ is the instantaneous response error-squared, and $(e^2)_{avg}$ is the average response error squared.

As explained above, use of adaptive inverse control to achieve online iteration eliminates the need for the off-line fast fourier transform function analysis traditionally used. This greatly simplifies iteration control. Moreover, the AIC on-line iteration, in contrast to the traditional off-line technique, requires substantially no operator skill because the on-line iteration is automatic. The traditional iteration approaches require the operator to evaluate and compare the response errors from successive iterations to determine when to stop the iterations of the test. In addition, traditional iteration approaches produce a fixed drive signal once the iteration process is finished. By contrast, the present invention operates on-line which allows the control system to continually adapt the drive signal to varying plant conditions.

Referring to FIG. 6, halting means 160 controls IPI network 36 to cause the IPI network 36 to stop adjusting the dynamic behavior of adaptive filter 34 in response to a selected input on line 162. Halting means 160 is preferably responsive to manual inputs received from an operator. Alternatively, a timer or an iteration counter can provide selected inputs to halting means 160 on line 162 to indicate that IPI network 36 should stop adapting adaptive filter 34. Halting means 160 comprises any of several well-known means used in adaptive filtering to halt the adaptation of the filter coefficients of filter 34. Since the filter coefficients of filter 34 represent a best linear estimate of the amount of drive error that gave rise to the response error, once an adequate estimate is made, IPI network 36 no longer needs to adapt the filter coefficients of adaptive filter 34. Once the IPI network 36 stops adapting adaptive filter 34, adaptive filter 34 operates simply as a fixed digital filter, such as a fixed FIR digital filter. Plant 51 can be non-linear as explained above, and these non-linearities are compensated by performing the on-line iteration technique described above with IPI network 36 adjusting adaptive filter 34 or with the adjusting being halted during the iteration process. In either case, adaptive filter 34 adjusts the response error signal 106 to provide the drive correction signal 108 which is added to the drive signal 35 to provide the corrected drive signal 112 which is stored in storage 54 to be used as a drive signal in the next iteration.

Although the present invention has been described with reference to preferred embodiments, workers skilled in the art will recognize that changes may be made in form and detail without departing from the spirit and scope of the invention.

What is claimed is:

1. A feedback control system for modifying a drive signal to a plant which provides an achieved response signal in response to the drive signal, the control system comprising:
   a signal source providing a desired response signal;
   switch means operable to a first mode and to a second mode;

difference means operable in response to the second mode of the switch means to provide a response error signal representing the difference between the desired response signal and the achieved response signal;

an adaptive filter operable in response to the first mode of the switch means to adjust the desired response signal in accordance with a dynamic behavior of the adaptive filter to provide the drive signal and operable in response to the second mode of the switch means to adjust the response error signal in accordance with the dynamic behavior to provide a drive correction signal;

compensation means for adjusting the dynamic behavior of the adaptive filter in response to the drive signal and the achieved response signal;

summing means operable in response to the second mode of the switch means to provide a corrected drive signal representing the sum of the drive signal and the drive correction signal;

storage means operable in response to the first mode of the switch means to delay the drive signal and operable in response to the second mode of the switch means to delay the corrected drive signal; and conversion means for generating the drive signal as a function of the signal delayed by the storage means from a previous iteration.

2. The feedback control system according to claim 1 for use in a test of the subsystem, the test having plural iterations, wherein the switch means is operable to the first mode during a first iteration of the test and to the second mode during subsequent iterations of the test.

3. The feedback control system according to claim 2 wherein the storage means comprises a storage device for storing the entire drive signal for use during one iteration of the test.

4. The feedback control system according to claim 1 wherein the plant has a dynamic behavior and the compensation means adjusts the dynamic behavior of the adaptive filter to substantially match the inverse of the dynamic behavior of the plant.

5. The feedback control system according to claim 4 wherein the compensation means includes least-mean-square algorithm means for approximating the dynamic behavior of the plant.

6. The feedback control system according to claim 1 further comprising:
gain control means operable in response to the second mode of the switch means for controlling the magnitude of the drive correction signal.

7. The feedback control system according to claim 6 wherein the gain control means controls the magnitude of the drive correction signal as a function of a ratio of an instantaneous value of the response error signal to an average value of the response error signal.

8. A feedback control system for modifying a drive signal to a plant which provides an achieved response signal in response to the drive signal, the control system comprising:
difference means for providing a response error signal representing the difference between a desired response signal and the achieved response signal;
an adaptive filter for adjusting the response error signal in accordance with a dynamic behavior of the adaptive filter to provide a drive correction signal;
compensation means for adjusting the dynamic behavior of the adaptive filter in response to the drive signal and the achieved response signal;
summing means for providing a corrected drive signal representing the sum of the drive signal and the drive correction signal;
storage means for delaying the corrected drive signal; and
conversion means for providing the modified drive signal as a function of the signal delayed by the storage means.

9. The feedback control system according to claim 8 further comprising:
switch means operable to a first mode to operate the adaptive filter to adjust the desired response signal in accordance with the dynamic behavior of the adaptive filter to provide the drive signal and to operate the storage means to delay the drive signal and to disengage the conversion means from generating the drive signal, the switch means being operable to a second mode to operate the adaptive filter to adjust the response error signal in accordance with the dynamic behavior of the adaptive filter to provide the drive correction signal and to operate the storage means to delay the corrected drive signal and to operate the conversion means to generate the drive signal.

10. The feedback control system according to claim 9 for use in a test of the subsystem, the test having plural iterations, wherein the switch means is operable to the first mode during a first iteration of the test and to the second mode during subsequent iterations of the test.

11. The feedback control system according to claim 10 wherein the storage means comprises a storage device for storing the entire drive signal for use during one iteration of the test.

12. The feedback control system according to claim 8 wherein the plant has a dynamic behavior and the compensation means adjusts the dynamic behavior of the adaptive filter to substantially match the inverse of the dynamic behavior of the plant.

13. The feedback control system according to claim 12 wherein the compensation means includes least-mean-square algorithm means for approximating the dynamic behavior of the plant.

14. The feedback control system according to claim 8 further comprising:
gain control means operable in response to the second mode of the switch means for controlling the magnitude of the drive correction signal.

15. The feedback control system according to claim 14 wherein the gain control means controls the magnitude of the drive correction signal as a function of a ratio of an instantaneous value of the response error signal to an average value of the response error signal.

16. An iterative feedback control system for creating a drive signal to a plant and for compensating for dynamic errors of the plant, the plant providing an achieved response signal in response to the drive signal, the control system comprising:
a signal source providing a desired response signal for each iteration;
difference means for providing a response error signal during iterations subsequent to a first iteration representing the difference between the desired response signal and the achieved response signal;
adaptive filter means for adjusting the desired response signal during the first iteration in accordance with a dynamic behavior of the adaptive filter means to provide the drive signal during the first iteration, and for adjusting the response error signal during the iterations subsequent to the first iteration in accordance with the dynamic behavior of the adaptive filter means to provide a drive correction signal;

compensation means for adjusting the dynamic behavior of the adaptive filter means in response to the drive signal and the achieved response signal;

summing means for providing a corrected drive signal during the iterations subsequent to the first iteration representing the sum of the drive signal and the drive correction signal; and storage means for storing the drive signal during the first iteration for use as the drive signal in a second iteration and for storing the corrected drive signal during the iterations subsequent to the first iteration for use as the drive signal in iterations subsequent to the second iteration.

17. The feedback control system according to claim 16 wherein the plant has a dynamic behavior and the compensation means adjusts the dynamic behavior of the adaptive filter to substantially match the inverse of the dynamic behavior of the plant.

18. The feedback control system according to claim 17 wherein the compensation means includes least-mean-square algorithm means for approximating the dynamic behavior of the plant.

19. An iterative feedback control system for providing a drive signal to a plant which provides an achieved response signal in response to the drive signal during each iteration, the control system comprising:

difference means for providing a response error signal for each iteration representing the difference between a fixed desired response signal and the achieved response signal from a corresponding iteration;

correction means for providing a corrected drive signal for use as the drive signal in the next iteration, the correction means, including:

means for accumulating and filtering the response error signals based on the plant performance during the current and previous iterations, the filtering being in accordance with a dynamic behavior, means for adding the accumulation of filtered response error signals to an initial drive signal to provide the corrected drive signal; and compensation means for adjusting the dynamic behavior in response to the drive signal and the achieved response signal.

20. The feedback control system according to claim 8 wherein the compensation means includes halting means for halting the adjusting of the dynamic behavior of the adaptive filter.

21. The feedback control system according to claim 20 wherein the halting means halts the adjusting of the dynamic behavior of the adaptive filter in response to a selected input.

22. The feedback control system according to claim 20 wherein the halting means halts the adjusting of the dynamic behavior of the adaptive filter after a selected time interval.

* * * * *

UNITED STATES PATENT AND TRADEMARK OFFICE
CERTIFICATE OF CORRECTION

PATENT NO. : 5,394,071
DATED : February 28, 1995
INVENTOR(S) : BRADFORD K. THOEN It is certified that error appears in the above-indentified patent and that said Letters Patent is hereby corrected as shown below:

On the Title Page of the Patent, delete [73]  Assignee: MTS Systems Corportion,
Minneapolis, MN insert [73]  Assignee: MTS Systems Corporation,
Minneapolis, MN Col. 5, line 42, delete "Off-line", insert --off-line--

Col. 6, line 16, delete ":response", insert --response--

Col. 6, line 55, delete "Switches", insert --switches--

Col. 8, line 11, delete "online", insert --on-line--

Signed and Sealed this

Twenty-third Day of May, 1995

Attest:

BRUCE LEHMAN

*Attesting Officer*     *Commissioner of Patents and Trademarks*